July 6, 1926.
N. D. GERINGER
1,591,123
LAWN MOWER GRASS CATCHING ATTACHMENT
Filed April 6, 1925
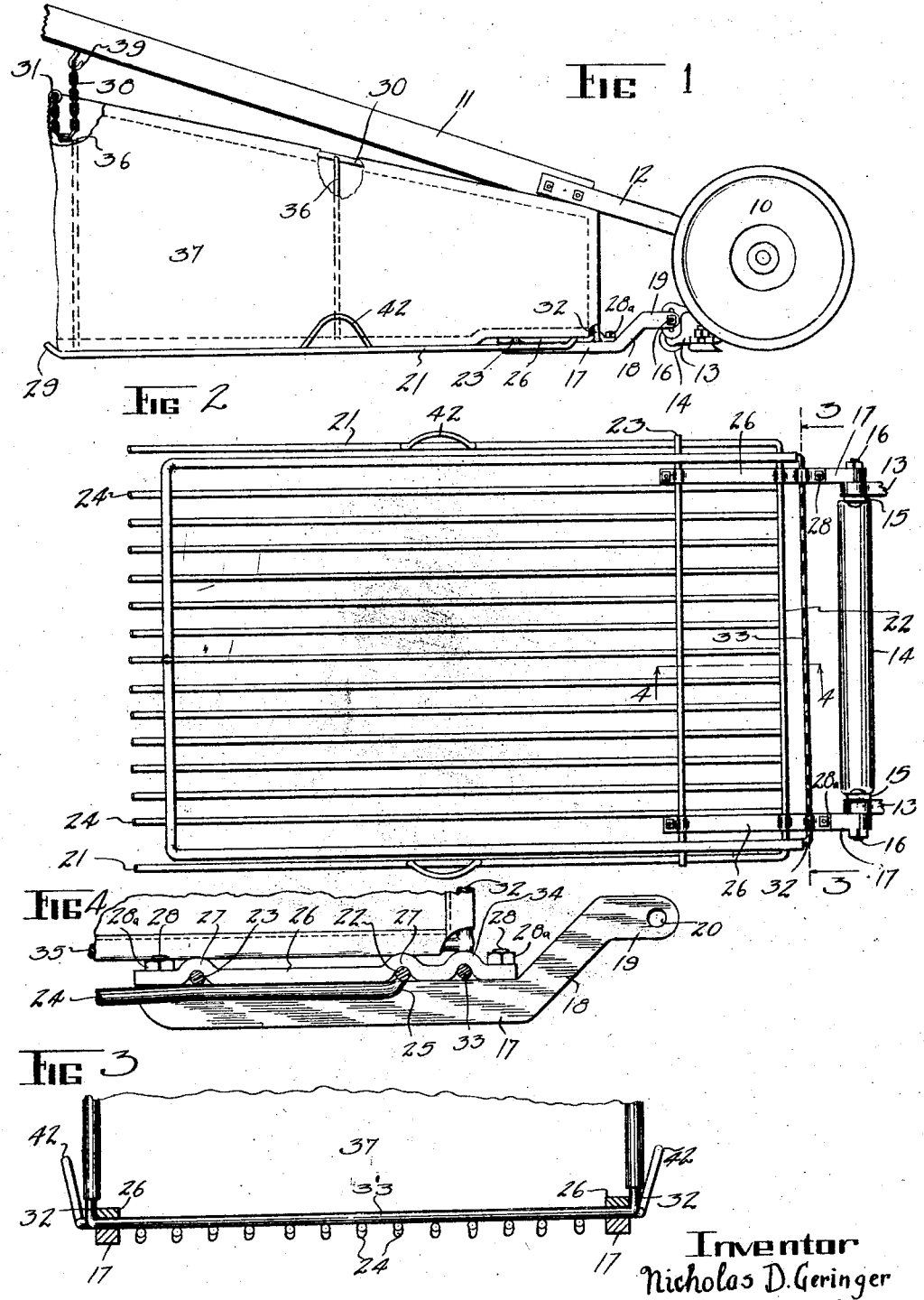
Inventor
Nicholas D. Geringer
By Bair Freeman Latta Attys Patented July 6, 1926.

1,591,123

UNITED STATES PATENT OFFICE.

NICHOLAS D. GERINGER, OF MARCUS, IOWA.

LAWN-MOWER GRASS-CATCHING ATTACHMENT.

Application filed April 6, 1925. Serial No. 20,997.

My invention relates to a grass-catching attachment.

It is my object to provide an attachment comprising a tined bottom member and a cage pivotally mounted at its forward end relative to said bottom member, the bottom member being adapted to catch the cut grass from a lawn mower, and the cage, when in lowered position to retain the grass upon the bottom member.

A further object is to provide such an attachment having a tined bottom member formed of a plurality of spaced rods disposed parallel to the path of movement of the device, and unconnected at their rear ends, whereby the cage may be lifted while the lawn mower is in motion, and the engagement of the grass stubble will retain the cut grass and allow the bottom member to slide from beneath the pile of grass, thereby enabling the removal of the grass from the catcher without stopping the progress of the lawn mower.

A further object is to provide a durable, simple and novel construction to accomplish the foregoing object, wherein the bottom member is formed of a number of parallel spaced rods connected at their forward ends by a pair of transverse spaced rods which are secured in a pair of skid members, adapted to be fastened to the lawn mower, the cage including a wire framework having a transverse rod at its forward end also secured in the skid members to allow pivotal movement of the cage.

A still further object is to provide such an attachment in which the cage may be quickly dropped into position after having been raised and will be guided to correct position by a pair of ears secured to the bottom member.

With these and other objects in view, my invention consists in the construction, arrangement and combination of the various parts of my device, whereby the objects contemplated are attained, as hereinafter more fully set forth, pointed out in my claims and illustrated in the accompanying drawings, in which:

Fig. 1 is a side elevation of a lawn mower with my grass-catching attachment attached thereto, parts being broken away to better illustrate the construction.

Fig. 2 is a plan view of the grass catcher and a portion of the mower roller.

Fig. 3 is a transverse vertical sectional view taken on the line 3—3 of Fig. 2.

Fig. 4 is a detail sectional view taken on the line 4—4 of Fig. 2.

In Fig. 1 I have shown the ordinary lawn mower having the traction wheels, 10, the handle, 11, connected thereto by a bracket, 12, the main frame, 13, and the roller, 14, connected to the frame by means of a vertically-extending pair of roller brackets, 15, which are secured to the frame by means of a bolt, 16.

I provide a pair of skids, 17, having the forwardly and upwardly inclined necks, 18, terminating in the forward extensions, 19, which are provided with openings, 20, designed to receive the bolts, 16, in order to secure the skids, 17, to the lawn mower frame.

The bottom member of the grass-catching attachment has the side tines, 21, formed of a single piece of heavy wire or metal rod bent in the shape of a U to provide the transverse member, 22.

Spaced rearwardly from the transverse member, 22, is a second transverse rod, 23, which is secured to the tines, 21, by welding or the like. A plurality of intermediate tines, 24, having their forward ends beveled as at 25 in Fig. 4 are similarly brazed or welded to the transverse members, 22 and 23, to form a unitary openwork structure which serves to receive the cut grass.

The transverse rods, 22 and 23, are secured upon the skids, 17, by means of a yoke, 26, of strap metal, which has the humped portions, 27, bridging the rods, 22 and 23. The yoke, 26, is received over studs, 28, projecting upwardly and secured by nuts, 28ª, threaded over the studs, 28.

The rear ends of the tines, 24 and 21, are curved upwardly, as at 29 in Fig. 1, in order that the lawn mower may be backed without the tines catching in the surface of the ground.

The cage comprises a wire frame having an upper U-shaped member with the side arms, 30, the rear transverse arm, 31, and the forwardly downwardly extending rods, 32, joined by a front transverse rod, 33. The rod, 33, is journaled under the raised portions, 34, of the yokes, 26.

The cage frame further comprises a lower U-shaped member, 35, welded or brazed to the vertical arms, 32, and connected to the upper U-shaped frame member by means of struts, 36. The sides and back of the cage are covered with canvas, 37, sewed to the upper and lower frame members.

A chain, 38, secured to the rod, 31, is linked to a hook, 39, depending from the handle, 11, and by raising the handle, 11, beyond its normal position when mowing, the chain, 38, will raise the cage above the bottom and allow the grass within to slide rearwardly relative to the bottom.

To each of the tines, 21, is secured an ear formed of a length of wire, 42, welded to the bars, 21. The ears, 42, extend upwardly and outwardly as shown in Fig. 3. When the cage is lowered into position the ears, 42, will guide it and center it relative to the bottom, 21. The ears further serve to prevent side swinging of the cage while the lawn mower is in motion.

The advantages of my device are several. The grass may be deposited without removing the grass catcher from the mower and without stopping the mower.

The skids, 17, may be adjusted laterally of the bottom member by removing the yokes, 26, and sliding the skids laterally of the rods, 22 and 23. Thus the attachment may be adjusted to fit any lawn mower.

If the cage is injured a new one may be substituted, using the old bottom member, and vice versa.

Some changes may be made in the construction and arrangement of the parts of my invention without departing from the real spirit and purpose of my invention, and it is my intention to cover by my claims any modified forms of structure or use of mechanical equivalents which may be reasonably included within their scope.

I claim as my invention:

1. A lawn mower grass catching attachment comprising a pair of skid members attachable to said mower, a bottom including a series of spaced tines secured together at their forward ends by a pair of transverse rods, said transverse rods being secured to said skid members, a cage hinged relative to said bottom at its forward end, adapted normally to rest upon said bottom and capable of being raised therefrom, and ears secured to the outer tines of the bottom to prevent sideward swinging of the cage.

2. A lawn mower grass catching attachment comprising a pair of attaching members, a bottom including a series of spaced tines secured together at their forward ends and to said attaching member, a cage hinged relatively to the bottom at its forward extremity, adapted normally to rest upon said bottom and capable of being raised therefrom, and ears secured to the outer tines of the bottom to prevent sideward swinging of the cage.

Signed at Marcus, in the county of Cherokee and State of Iowa, this 20th day of March, 1925.

NICHOLAS D. GERINGER.